United States Patent [19]

Parham

[11] 4,064,957
[45] Dec. 27, 1977

[54] THREE-WHEEL MOTORCYCLE

[76] Inventor: Harold D. Parham, R.R. 1, White Plains, Ky. 42464

[21] Appl. No.: 693,119

[22] Filed: June 4, 1976

[51] Int. Cl.² ........................................... B62D 61/06
[52] U.S. Cl. ................................. 180/27; 280/112 A
[58] Field of Search ..................... 180/27, 25, 33 R; 280/87 B, 112 R, 112 A

[56] References Cited

U.S. PATENT DOCUMENTS

| 2,029,735 | 2/1936 | Minott | 280/87 B X |
|---|---|---|---|
| 2,137,947 | 11/1938 | Moore | 280/87 B X |
| 2,353,503 | 7/1944 | Rost et al. | 280/112 A |
| 2,615,727 | 10/1952 | Bancroft | 280/87 B |
| 2,819,093 | 1/1958 | Geiser | 280/112 A |
| 2,878,032 | 3/1959 | Hawke | 280/112 R X |
| 3,224,523 | 12/1965 | Ross | 180/25 R |
| 3,746,118 | 7/1973 | Altorfer | 280/112 A X |

FOREIGN PATENT DOCUMENTS

| 854,408 | 5/1939 | France | 280/772 |
|---|---|---|---|

Primary Examiner—Joseph F. Peters, Jr.
Assistant Examiner—Terrance L. Siemens
Attorney, Agent, or Firm—Clarence A. O'Brien; Harvey B. Jacobson

[57] ABSTRACT

A three-wheel motorcycle having an outer frame with rear wheels mounted on a double axle with differential therebetween for a drive from a powerful automobile type engine together with an inner support frame pivotally mounted from said main outer frame with said inner pivotal frame supporting the front motorcycle type single steerable wheel. Handlebars mounted for four-way movement together with an operator's seat and passenger seats are also supported and mounted on the pivotal frame. A unique hydraulic actuated tilting mechanism is associated with the two frames for semi-automatically tilting the inner pivotal frame and the front wheel, operator and passenger thereon, whenever the operator turns the handlebars in order to make a turn of the vehicle and/or a turn is made which will exert centrifugal force upon the device. A pivotally suspended mass associated with the actuating mechanism aforesaid will automatically through the hydraulic mechanism tilt the inner frame whenever centrifugal force acts upon said suspended mass. This automatic operation as effected by the pivoted mass will function as a safety factor to automatically tilt the inner frame even though the operator neglects to do so. Other features include a fail-safe system for the hydraulic mechanism in case of hydraulic failure, a unique shock and spring mechanism for the inner frame, and the use of the frame tubing as part of the overall cooling system for the high powered internal combustion engine.

6 Claims, 14 Drawing Figures

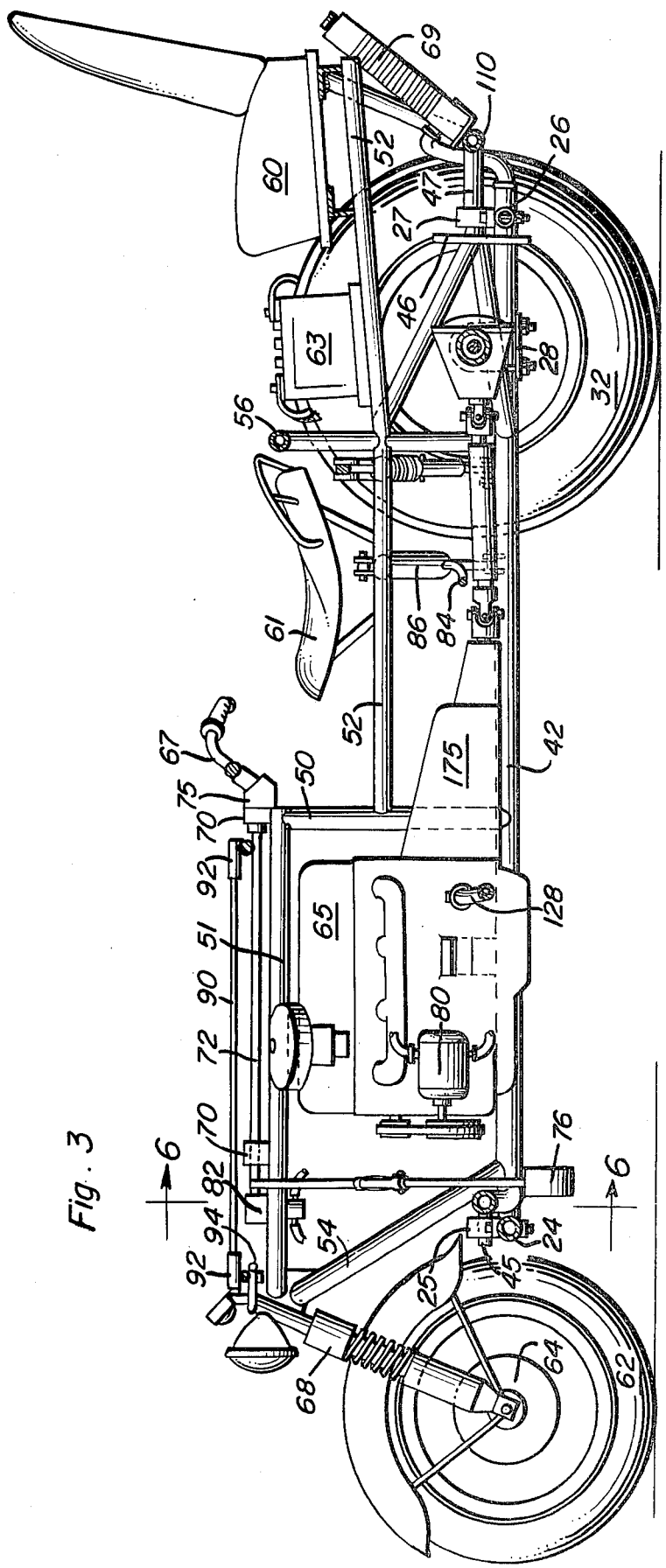

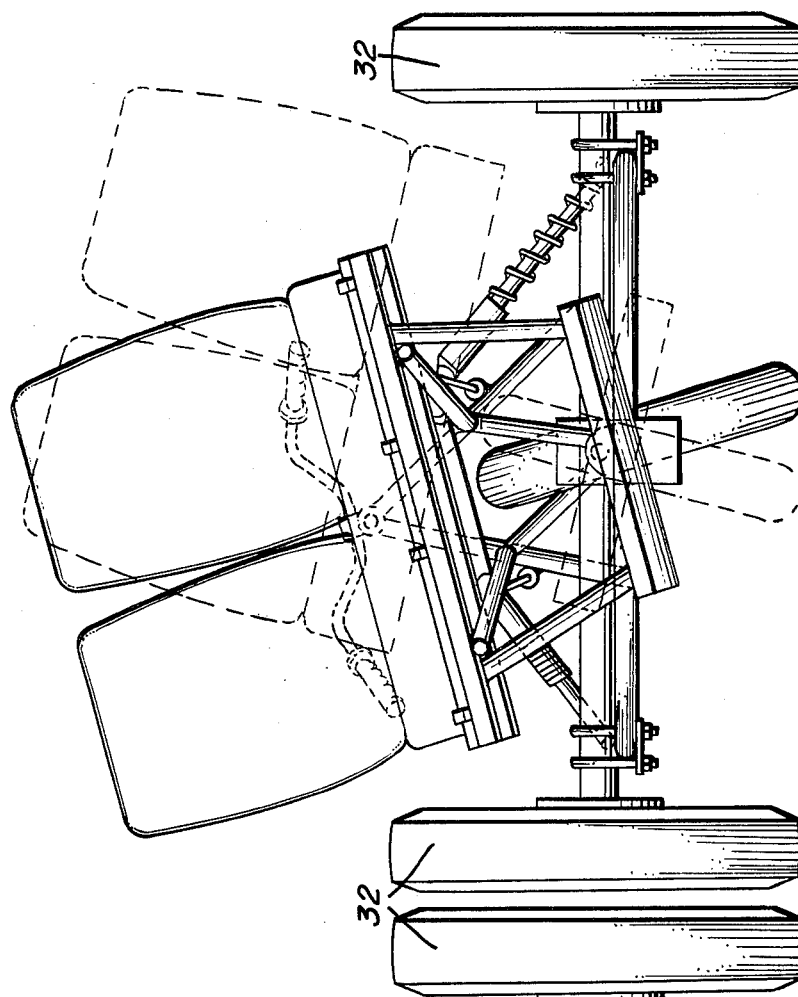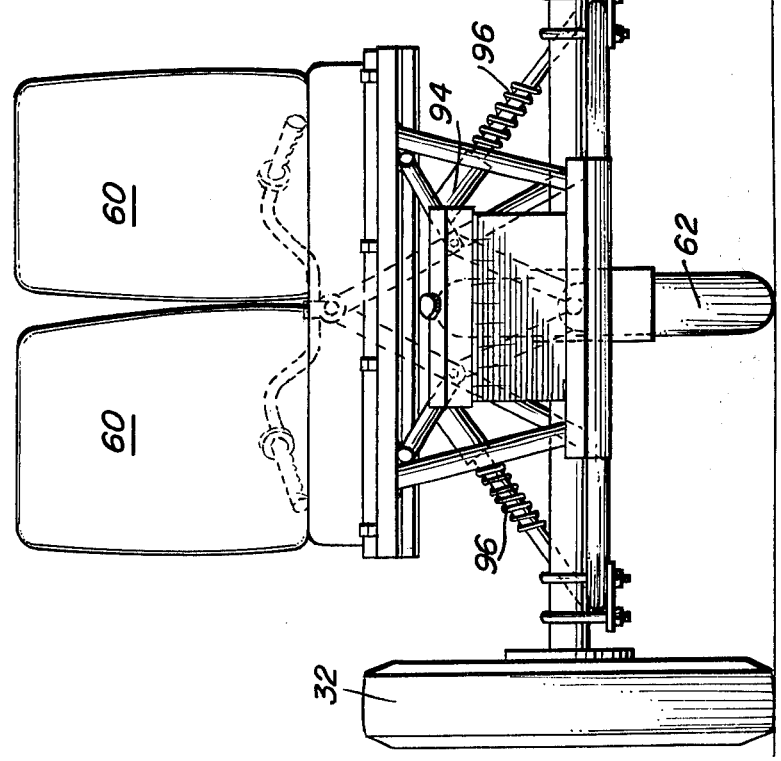

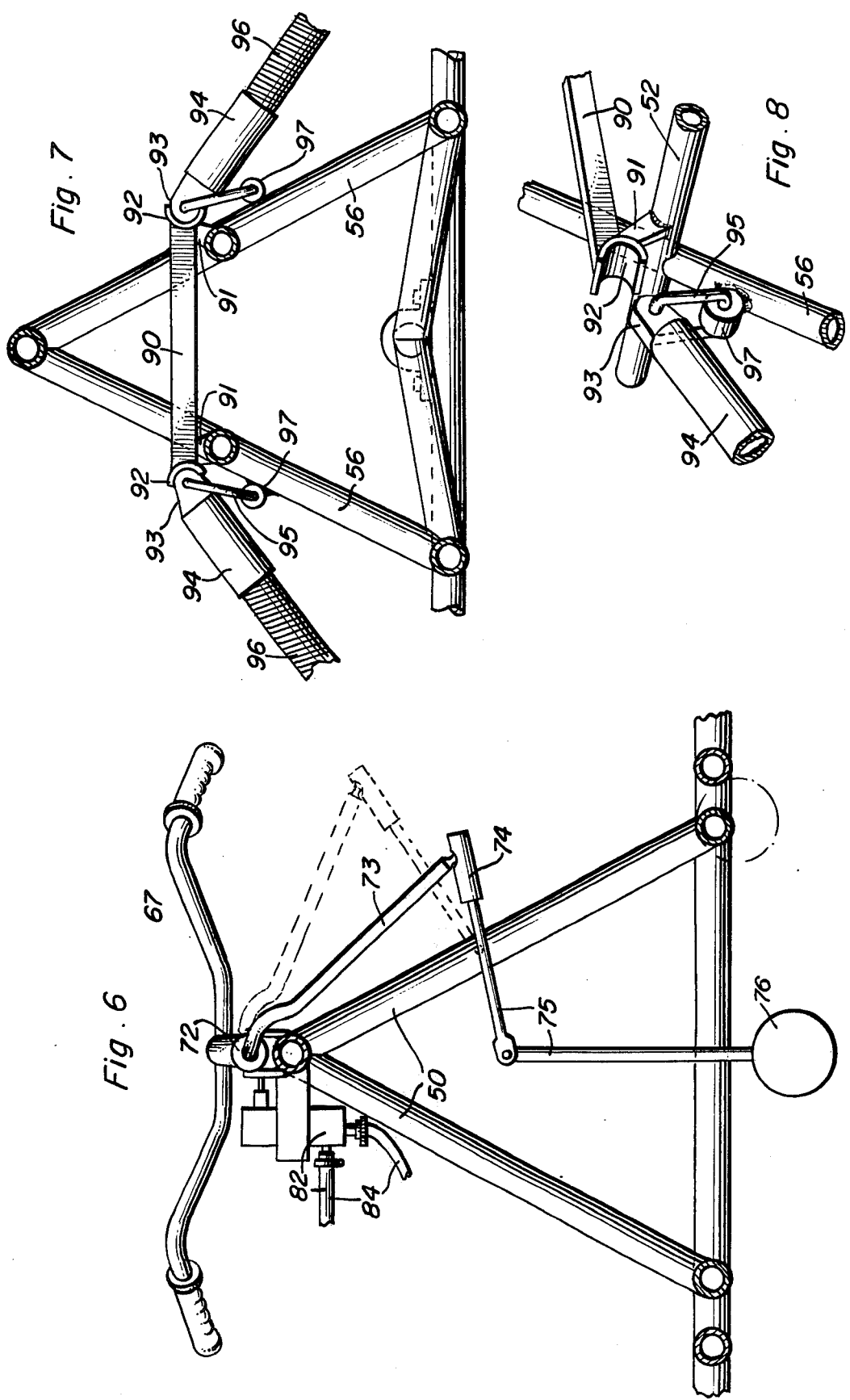

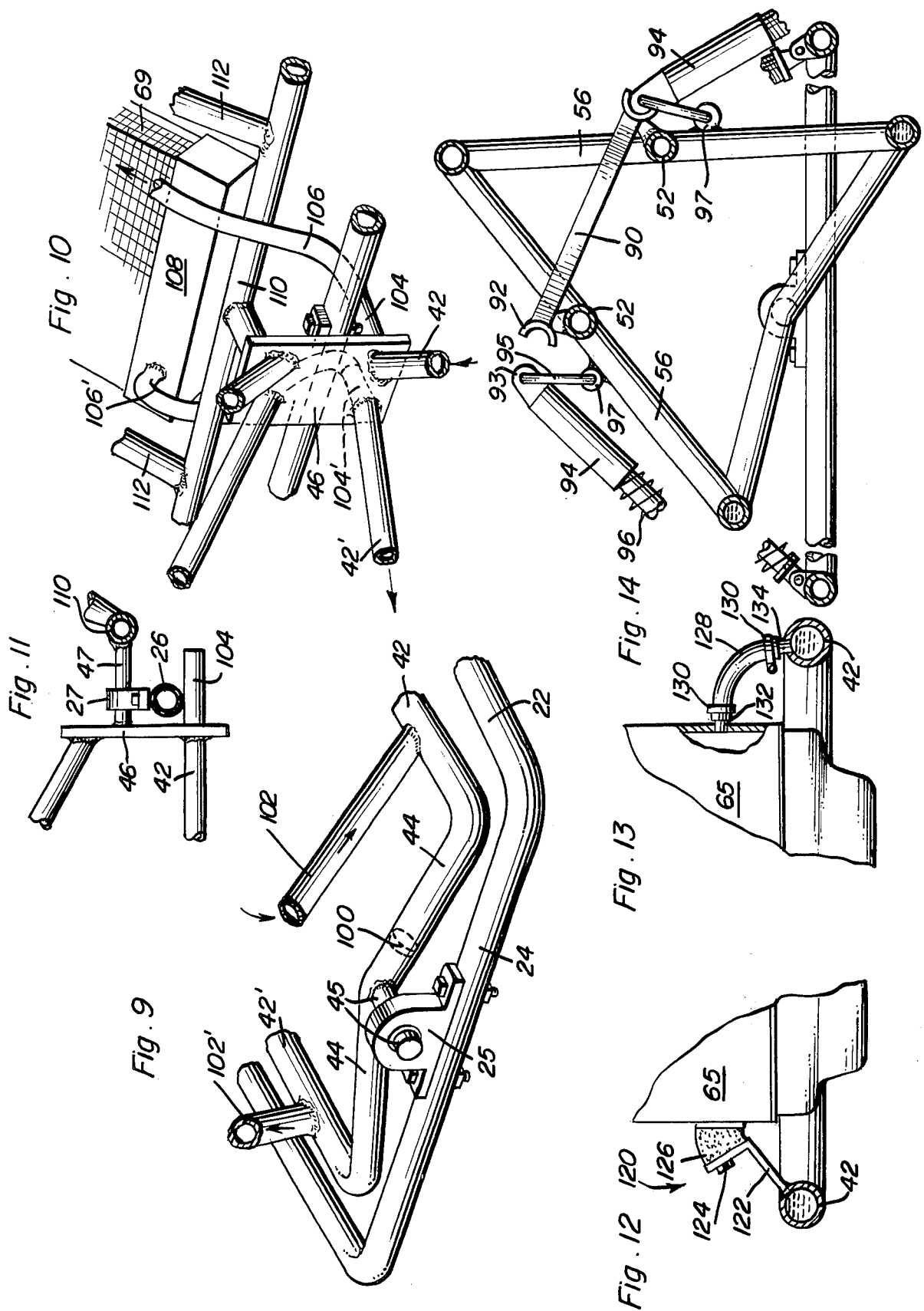

THREE-WHEEL MOTORCYCLE

BACKGROUND OF THE INVENTION

1. Field of the Invention

This invention relates generally to motorcycle-type devices having three wheels for increasing the usability as a passenger-type vehicle and to increase the safety of such motorcycle-type vehicles.

2. Description of the Prior Art

A common problem with known three-wheel type motorcycle devices is that upon entering or maneuvering through a turn at high speeds, and even at more normal moderate speeds, they are extremely subject to flipping or turning over. This is due to the problem created by centrifugal force acting upon the relatively high center of gravity of the vehicle. Conventional two-wheel motocycles lean into a turn and thus lower the center of gravity and effectively counterbalance the centrifugal force to prevent this flipping over or turning over. With three-wheel vehicles this normally cannot be done because of the action of the third wheel.

Another problem with known three-wheel vehicles is that they commonly have two front wheels for driving the vehicle and pivot or turn the rear single wheel for operation of said vehicle. This offers many additional problems over a motorcycle having a single front steerable wheel.

Another problem with known devices that do permit the banking or tilting of the operator and/or passengers is that a good portion or even most of the weight of the vehicle itself does not tilt which only partially solves the problem. The engine of the vehicle is one of the heaviest components overall and failure to mount the power plant so that it may bank is one of the limitations of these known devices.

Another problem of known devices which employ mechanism for banking or tilting portions of the vehicle is that they do not provide fail-safe mechanism for the operating structure thereof. That is, if something should happen during the operation of the vehicle, they will not normally resume a neutral or upright position by themselves after the turn is completed.

These problems together with many others such as difficulty in cooling internal combustion operated engines, the structural mounting of said engines, the problem of shock structures and self-righting features, together with the lack of a automatic or semi-automatic operation all are limitations of existing known devices.

Known prior art patents which may be pertinent to this invention are as follows:

| | | |
|---|---|---|
| 2,493,817 | T. G. Hare | Jan. 10, 1950 |
| 3,224,523 | T. J. Ross | Dec. 21, 1965 |
| 3,447,623 | I. V. K. Hott | June 3, 1969 |
| 3,610,358 | W. H. Korff | Oct. 5, 1971 |
| 3,746,118 | E. J. Altorfer | July 17, 1973 |

None of these known prior art devices offers the new and unique features of the invention disclosed herein.

SUMMARY OF THE INVENTION

An object of the present invention is to provide a three-wheel motor vehicle which is powered from two rear wheels mounted on a primary support frame together with a pivotally mounted inner frame connected to a single steerable front wheel with said inner frame being semi-automatically tiltable into a bank when the vehicle is turned.

Another object of the present invention is to provide a three-wheel motorcycle having a pivotal support frame for the operator and/or passengers together with support structure for the high powered drive engine and steerable and pivotable handlebar mechanism for turning the single front wheel mounted on said pivotal frame. An outer support frame pivotally supports this inner frame and has double wheel drive mechanism supported from the rear thereof. Appropriate semi-automatic actuating mechanism is associated with the two frames for effecting the tilting function.

A further object of this invention is to provide an improved three-wheel motor vehicle having outstanding safety characteristics and overall operating efficiency.

A still further object of this invention is to provide a three-wheel motor vehicle having a semi-automatic tilting feature to overcome the effects of centrifugal force when the vehicle is going into and through a turn at normal and high speeds so as to maneuver the turn with complete safety and at speeds much higher than would normally be safe.

A still further object of this invention is to provide a motor vehicle which is semi-automatic in tilting action with fail-safe features in case the actuating mechanism for said tilting feature fails during operation and/or while in a turn or other maneuver.

A still additional further object of this invention is to provide a motor vehicle having an operator's seat and at least two passenger seats mounted thereon together with hydraulic actuated mechanism for tilting said structure when the vehicle is operated in a turn.

An additional still further object of this invention is to provide a three-wheel motor vehicle employing the frame tubular structure as part of the overall cooling system for the internal combustion engine which operates the vehicle. Appropriate cooling structure is provided at the rear of the vehicle and connected through said tubing to the internal combustion engine.

Another still further object of this invention is in the shock and associated spring cam structure for semi-automatically righting the vehicle after a maneuver has been completed.

An additional still further object of this invention is in the provision of the handlebar and front wheel tie rod connecting mechanism together with fourway pivotable suspension for the handlebar.

An additional further object is in the provision of a centrifugal force actuated pendulum system for the tilting mechanism of the three-wheel motorcycle of this invention.

The three-wheel motorcycle disclosed herein has a number of new and unique features which greatly increase the overall efficiency and safety thereof. The basic structure includes a main overall outer tubular frame having supported from the rear thereof a pair or set of drive wheels connected by axles to a center differential for drive from universal joints and drive shaft by a high powered internal combustion engine. A pivotally mounted inner frame is supported from said base frame with said inner frame supporting the high powered internal combustion engine for tilting and pivotable movement of same together with the frame. Also, mounted on said pivotable frame is the single steerable front wheel of conventional motorcycle type and steering handle bar structure mounted on a unique fourway pivot mechanism together with associated tie rod connections in order to effect turning and steering of the single front wheel. Also associated with this steering and tilting structure is a pivotable mounted weight or mass for actuation by centrifugal force when the vehicle goes into a turn. This pivoted mass is connected to a hydraulic valve system for automatic operation of the hydraulic system when the vehicle is in a turn. This structure is connected with the handlebar mechanism so that the automatic feature will override or control the tilt unless completely overridden by an operator through extreme counter force.

A shock and spring structure is associated with the two frame structures for normally maintaining the pivotable and tiltable center frame in an upright position relative to the main outer frame. New shock and cam mechanism also is provided to provide the function of only a single shock on the side which is taking the force of the device as it progresses through a turn.

Another very important feature is in the mounting of the operator's seat together with at least two passenger seats therebehind for use of the vehicle as a general purpose people carrying structure with greater capacity than is conventional with motorcycle type devices.

Another feature of this device is in the associated cooling structure which includes a radiator for the cooling water of the internal combustion engine together with the use of the tubing of the frame structure as part of the connecting pipes between the internal combustion engine and the radiator.

Another important feature is in the use of a high powered internal combustion engine of far greater horse power and capacity than is common with normal two-wheel motorcycle devices. Furthermore, even though the overall vehicle has much greater power and high speed capability than conventional type motorcycles, the safety factor is nevertheless greatly increased thereover. In addition, each wheel has appropriate individual brake mechanism associated therewith so that if one or even two of the brakes should be lost or become inoperative, the others or remaining one will still be functional.

These, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a side elevational view of the device of this invention.

FIG. 4 is a rear end view, showing the center tiltable portion of the device in an upright position.

FIG. 5 is a rear end view showing the tiltable portion of the device in a tilted position as in making a left-hand turn.

FIG. 6 is a view from the front, partly in cross section, of the handlebar and pivotable tilt control structure.

FIG. 7 is a front view of the shock absorber-tilt cam mechanism for semi-automatically positioning of the tilting frame portion of the device.

FIG. 8 is a slightly enlarged section, in perspective of the shock absorber-tilting cam link structure.

FIG. 9 is a perspective view of the front pivot mechanism also showing the cooling water flow for the internal combustion engine.

FIG. 10 is a view of the rear frame support structure and pivot point together with the connections to the radiator for the cooling system.

FIG. 11 is a side elevational view of the structure, in part, associated with the pivotable mount, as shown in FIG. 10.

FIG. 12 is a corner view, partly in cross section showing a sample motor mount for the internal combustion as supported by the tubular frame on one side.

FIG. 13 is a corner view of a portion of the device, partly in cross section, showing the waterline connection to the internal combustion engine.

FIG. 14 is a view from the front taken just before the shock absorber, tilt cam structure showing the inner pivotable frame as tilt to the left as in FIG. 5.

DESCRIPTION OF THE PREFERRED EMBODIMENT

Figure 1:
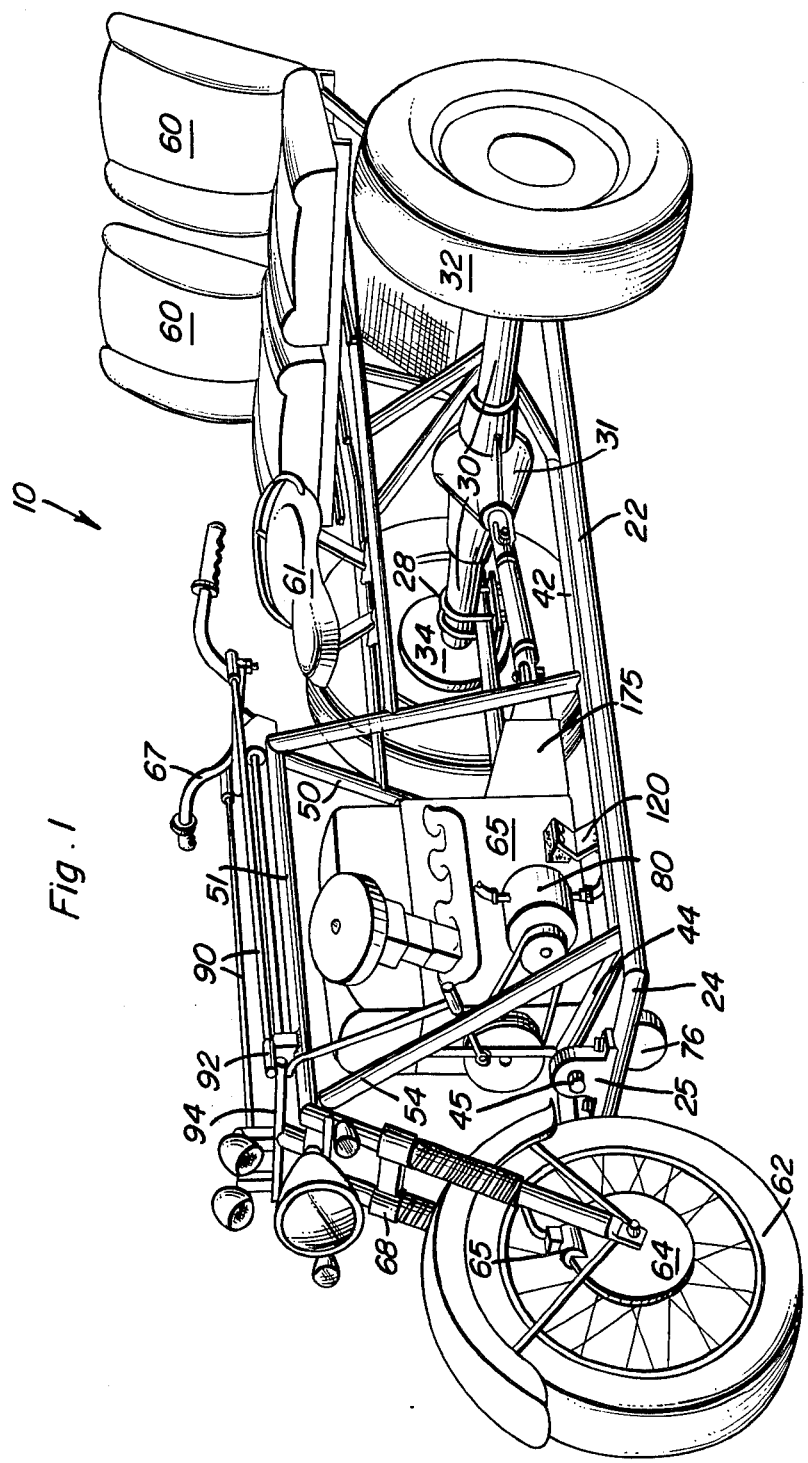
FIG. 1 is a perspective view of the three-wheel motorcycle of this invention.
Figure 2:
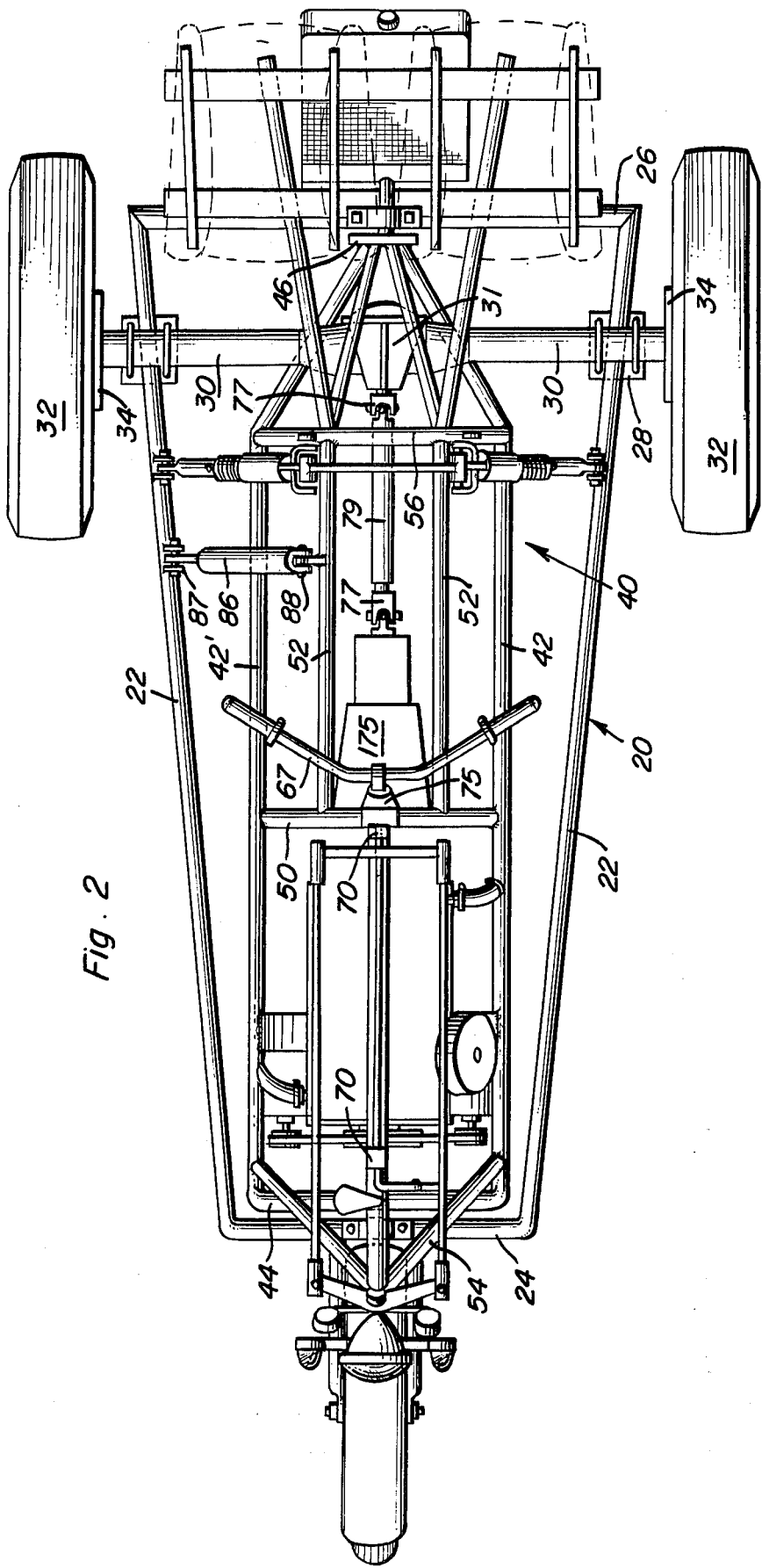
FIG. 2 is a top plan of the three-wheel motor vehicle of this invention.

Referring to FIG. 1 of the drawings, reference numeral 10 indicates in general the three-wheel motorcycle of this invention. As shown, it is in its normal upright position as in a rest position. Looking at FIGS. 1, 2 and 3, the basic structure of this device will now be described. The basic or primary frame support for this device is indicated in FIG. 2 by reference numeral 20. The tubular frame has longitudinal portions 22 extending from the front to the rear of the vehicle with similar connecting tubular members 24 at the front and 26 at the rear of said frame. Supported upon the front cross connecting tube 22 is a pillow block or pivot bearing 25 while a similar pillow block 27 is provided on the rear traverse tube 26. These pillow blocks or bearing supports 25 and 27 are the ones that support the pivotal inner frame structure to be described below. Normally this outer tubular frame just described will remain flat or parallel to the road surface or terrain surface being traversed.

An automobile-type axle and differential assembly 30, 31 is clamped or connected to the side rails 22 by conventional means such as 28 shown. The outer end of each axle 30 supports wheels 32 for driving contact with the road surface and to transmit the high power from the internal combustion engine 65 of the device through the differential 31 and drive axles 30 to said rear wheels. Appropriate brake drums or discs 34 are indicated. As designed or constructed each of these brake systems are individually connected to the primary brake actuators either on the handlebars or other desired position. Just so the actuators are available for operation by the driver/operator for braking. This arrangement provides an increased safety factor. That is, if one or two of the brakes of the overall motorcycle should fail, the remaining ones or one will still be operative and functional.

The pivotally mounted inner tubular frame indicated in FIG. 2 in general by reference 40 includes longitudinally extending side members 42 connected at the front by an inverted V-shaped cross connection 44 and at the rear by the solid plate 46. As can be visualized, the projecting extensions 45 and 47 pivotally support this inner frame from the outer frame 20 described above. At the mid-center of the pivotal support frame is provided an inverted A frame 50 for supporting the handlebar structure. At the front of the pivotal secondary frame is another A frame 54 for supporting the single front mounted wheel of this device. Horizontal tubing 51 connects and strengthens the overall frame. Additional inverted A frame 56 is provided slightly forward of the rear axle position and connects to horizontal extending frame structure 52. All of the above described frame structure is made of tubular steel material and appropriately welded at the various connections thereof. Mounted upon the horizontally extending tubing 52 of the pivotable inner secondary frame are passenger seats 60, an operator's seat 61, battery 63, handlebar structure 67, and support structure 75. Also, the large capacity and large power internal combustion engine 65 is supported by appropriate resilient motor mounts from the inner pivotable frame structure.

The front fork structure 68 supports a single motorcycle type wheel 62 having a disc brake 64 with actuating mechanism 67. Appropriate running lights, turn lights and headlights are also mounted upon this front fork structure as is conventional with motorcycle-type devices. Also, the radiator 69 is mounted on this pivotable frame. Thus, it can be seen already at this point of the description, that much of the weight of the overall motorcycle is mounted upon the pivotable inner frame and since this is the part that will be tilting into the turn against the action of centrifugal force, it is obvious how the greatly increased safety of this vehicle is achieved. That is, of course, because the heavy weight engine, the heavy radiator, heavy battery, the weight of the water in the entire cooling system, the weight of the operator and passenger seats, the weight of the steering front wheel suspension, together with the weight of the operator himself and/or accompanying passengers are all part of the mechanism which tilts into the turn and against the action of centrifugal force.

Mounted at the top of the horizontal tubular structure 51 and appropriately spaced therealong are bearings 70 for supporting the pivotable mass structure for automatic actuation of the tilt control of this invention. The handlebar 67 is supported by a fourway pivot structure 75 which in turn transmits appropriate turning action and pivotable action through the member 72 to the pivot mass 76. The pivot mass 76 is suspended from the pivotable support frame by connecting rods or tubes 75' tie rod ends 74, and tubing 73 appropriately fastened to the longitudinally running tube 72. One important function of this suspended mass 76 is in the great amount of safety achieved by its operation. That is if a operator goes into a turn extremely fast and the bike should get away from him, i.e., he should lose control of same, the suspended mass together with the actuating linkage will automatically move in the correct direction in order to actuate the hydraulic tilt mechanism in order to tilt the suspended weight in the proper direction to counteract the effect of centrifugal force. This is extremely important safetywise because if one gets into such a dangerous and unexpected situation a normal person's reaction time is not sufficient to manually effect the proper tilting action. With this device such manual reaction is entirely unnecessary because the suspended pendulum system will automatically cause and effect the proper tilt. This has been tested numerous times in actual practice and works surprisingly well. Connected to the actuating linkage 72, 73 is a hydraulic control valve 82 connected to the hydraulic system by high pressure hydraulic lines 84. The hydraulic pump 80 is shown in FIG. 3 mounted on the side of the engine and appropriately driven therefrom for supplying the necessary high pressure hydraulic fluid to the system. Shown in FIGS. 2 and 3 is the hydraulic actuated piston and cylinder 86 which effects the proper tilting action in either the right-hand or left-hand direction as required. This is a common conventional type double acting hydraulic cylinder such as commercially available. Appropriate pivot connections 87 and 88 are provided at each end thereof and connected between the outer primary frame 22 and the inner pivotable frame member 52. As already mentioned, this double acting hydraulic cylinder and piston therein is hydraulically connected by the high pressure lines 84, not shown as connected in these figures for the sake of clarity of the rest of the structure.

Looking at FIG. 2, the engine 65 having a conventional type multi geared transmission 175 is appropriately connected by universal joints 77 by means of drive shaft 79 to the differential 31.

The handlebar 67 mounted by fourway pivot structure 75 is also appropriately connected by tie rod ends 92 through tie rods 90 to the steering fork actuator 94. Thus, as the handlebars are turned in one direction, the fork and single steering wheel 62 mounted therein will correspondingly turn in the same direction just like a simple two-wheel bike. Thus, as can be readily visualized, by turning the handlebars in one direction or the other, the front wheel will correspondingly turn in the same direction. Also, if the handlebars 67 are tilted as in a bank, in one direction or the other, by means of the pivot rod 72 the hydraulic control valve 82 will be properly actuated to tilt the passenger and operator portion of the device.

Another important feature of this device is in the strut and shock absorber with cam engagement mechanism. For clarity of view, this structure has been omitted from that shown in FIG. 1, but FIGS. 2 and 3 show this mechanism as properly installed on the device. FIGS. 7, 8, and 14 also show this structure in enlarged separate detail. This structure comprises a horizontal bar member 90 having at each end thereof cam engaging structure 92 supported by short brackets 91 and welded to the longitudinal frame members 52. The cam portions 92 complement and engage with the cam projection 93 on the upper ends of the shock absorbers 94. Centering springs 96 preferably are used in addition to the shock absorbers 94. The upper end of the shock absorbers 94 are appropriately connected by links 95 to the inverted A frame structure 56 by pivot supports 97.

FIG. 7 shows a clear end view of the cam portions 92 and 93 together with the pivot links 95. FIGS. 8 and 14 are views with the inner frame structure being tilted so as to disengage the complementary cam portions. The overall purpose of this structure is as follows: when the hydraulic cylinder 86 is in the center position, that is with no tilting pressure being applied thereto, the springs 96 will center the center pivotable frame by the engagement of cam members 92, 93. When a banking action is applied by means of appropriate hydraulic pressure to the cylinder 86 and the inner pivotable frame is moved in one direction or the other, the corresponding shock 94 on the side into the bank, or into the turn, will then be compressed through the engagement of the cam surfaces 92 and 93. The other shock and spring structure will be completely disengaged from the center frame but will be retained in position for further future action by the link 95. Thus it can be seen that the shocks will only work on one side or the other when the device is in a turn. However, if the pressure for the hydraulic cylinder 86 should fail for any reason, the springs 96 will exert a centering force upon the central frame and return it to its upright position after completion of the turn. This is an added safety feature.

FIGS. 4 and 5 show this operation as viewed from the rear of the vehicle with most of the structure other than the strut and self-centering structure eliminated from these views. As can be seen in FIG. 4, the springs 96 appropriately cause both the cam structures to be engaged and the center frame to be in the upright center position. Then in solid lines in FIG. 5, a view is shown as going into a left turn with a corresponding left bank of the device. As can be seen, the shock on the left side is appropriately engaged with the spring 96 being compressed. The other shock on the right side is disengaged from operation with the structure and both the shock and spring are in the completely relaxed position. The dotted line portions indicate the appropriate bank in the case of a right turn and right bank. The shocks as would be positioned in this right turn have not been shown for the purpose of clarity. Obviously, conventional type pivotable connections for the lower ends of this shock structure are provided and attached to the lower frame structure, not shown or indicated by reference numerals.

Another important structure is shown in FIGS. 9, 10 and 11 of the drawings wherein the rear support plate 46 connects the tubular frame members of the pivotable inner frame structure together for pivotable action by means of the projection member 47 through the pivot bearing 27 and also continues to the horizontal tube 110 for supporting the rear of the pivotable frame structure, the radiator and the passinger seats 60 thereon. Vertical supports 112 are part of this structure.

The cooling system for the internal combustion engine of large capacity and high horse power, which of necessity requires a lot of cooling is unique. As shown in FIG. 9, the front of the pivotable secondary frame has a plug 100 provided within the inverted V portion 44 for blocking water across or traverse to the frame. An input connection 102 is tapped and welded to longitudinally extending frame member 42 to provide an input passage for cooling water to this side of the device. The flow of water will continue through the tube 42 back to plate portion 46 wherein the tube 42 continues into short extension 104. This extension 104 is connected by flexible radiator hose 106 to one of the header cores of the radiator, as is conventional in cooling systems, not shown in this view. A bottom header 108 of the radiator 69 is appropriately connected by additional radiator hose 106' to the other side of the longitudinally extending frame tubing 42' by an extension 104', shown in dotted lines in FIG. 10.

Return coolant will flow through 42' back to outlet 102', as again shown in FIG. 9, for appropriate connection to the engine cooling system. Thus, as can be seen from the above description, the frame itself is used as part of the cooling system structure and eliminates the use of long extensions of radiator hose and the like between the center mounted drive engine and rear mounted cooling radiator.

FIG. 12 shows one of the resilient motor mounts for supporting the engine 65, indicated in general by reference numeral 120. Basically, this consists of structural member 122 appropriately shaped and formed with an aperture therein for reception of a retaining bolt 124 and a resilient yet firm motor mount 126. This motor mount, as is conventional, will absorb a good many of the vibrational forces which are inherent in any internal combustion engine and prevent transmission of same to the frame structure and the operator and passengers.

FIG. 13 shows another method of connecting the water jacket of the internal combustion engine 65 to the frame tubing 42 for the flow of water coolant therethrough. A flexible high pressure hose 128 is clamped by clamps 130 to projecting outlets and inlets 132 and 134, respctively, provided on the engine water jacket and the support tubing. This connection 128 may be used instead of the one 102 described for FIG. 9.

The three-wheel motorcycle as shown and described has actually been built and satisfactorily tested. The device as built weighs totally 1330 lbs. and is provided with a 96 horse power, 4 cylinder, internal combustion engine. A conventional automotive-type transmission drive arrangement; differential, axles and wheels have been employed with excellent results. This device is extremely economical, achieving upwards of 50 miles per gallon of gasoline, and is extremely safe. In operation, the device will take a turn substantially like a two-wheel bike. When going into a turn at high speeds, the automatic pivotal actuating mass 76 will cause the center support structure to lean into the bank and give the equivalent action of a two-wheel motorcycle. Repeated driving tests have shown that this new and unique three-wheel motorcycle will keep up with any conventional two-wheel motorcycle in the turns and then upon coming to the straightway, the much greater horse power of the automotive-type engine will permit the operator, together with any passengers thereon, to quickly accelerate and pull away from the conventional two-wheel bike.

As is well known with motorcycle enthusiasts throughout the world, three-wheel bikes have often been labelled as "suicide machines". That is because anyone daring to enter a relatively sharp turn at high speeds is taking his life in his hands. That is because of the fact that the bike normally cannot lean or bank against the force of the centrifugal action and the bike will tend to tip over, thus being extremely dangerous to both operator as well as any passengers that may be with same.

Normally, of course, on a two-wheel bike, only one passager would be carried, while in the device disclosed herein at least two such passengers may be carried and with slight modification, as also envisioned by this invention, more than two may be easily carried. By simple modification, at least four passengers could easily be supported and carried by this device without sacrificing operation or safety. Thus, the device would be a five people carrier which would compete capacitywise with most automobiles on the road today and would far surpass them in fuel economy and miles per gallon achieved.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In a three-wheel motorcycle device having a prime mover, structure operable with the prime mover to operate the device, and structure used for seating, the improvement comprising:

a first support frame, the first support frame having an axle mounted for rotation on the rear portion thereof, a wheel being mounted on each end of the axle;

a differential mechanism mounted centrally of the axle;

a second support frame mounted for pivotal movement on the first support frame, a third wheel being mounted at the forward portion thereof, the prime mover, structure associated therewith, and seating structure being mounted on the second support frame, the major portion of the gross weight of the motorcycle device thus being carried by the second support frame;

pivotal drive transmission means connecting the prime mover to the differential mechanism for rotating the axle;

pivotal handle means mounted to the second support frame proximate to at least a portion of the seating structure for use by an operator to steer the motorcycle device; and, means responsive to pivotal movement of the handle means to tilt the second support frame relative to the first support frame when the motorcycle device is turned into a banking maneuver.

2. The apparatus of claim 1 wherein the second support frame comprises support members lying in surmounting relation to the first support frame, the apparatus further comprising shock absorbing means comprised of:

at least two shock absorbing rod elements, one each of the elements being oppositely disposed on either side of the first support frame and being pivotally attached thereto, the rod elements having enlarged shoulder portions at the upper free ends thereof, the ends of the shoulder portions being arcuately formed and comprising camming surfaces, each rod element further extending upwardly from the point of connection to the first support frame toward the support members of the second support frame; linkage means pivotally attached at a first end thereof to the free ends of each of the rod elements, the linkage means being pivotally attached at second ends thereof to first portions of the support members of the second support frame; cam members attached to second portions of the support members of the second support frame on opposite sides thereof, the cam members having arcuate camming surfaces which mate with the arcuate camming surfaces on the upper free ends of the rod elements; and, spring means carried on each of the rod elements and being compressible between the shoulder portion thereof and a point lying between said shoulder portion and the point of connection of the rod element and the first support frame, the spring means biasing the camming surfaces on the rod elements into engagement with the camming surfaces of the cam members when the second support frame is disposed in non-tilting relation to the first support frame, pivotal movement of the handle means causing the second support frame to tilt toward one or the other side of the first support frame, the spring means lying in the direction of the tilt being compressed while the spring means lying in the direction opposite the tilt being expanded, the camming surfaces lying in the direction opposite the tilt thereby being disengaged from each other, the rod element lying in the direction opposite the tilt thereby remaining in pivotal engagement with the second support frame by pivotal connection with said second support frame through the linkage means, the spring means acting further to return the second support frame to a level disposition with respect to the first support frame which the handle means are caused to return to a non-banked disposition.

3. The apparatus of claim 2 wherein the last mentioned means comprise:

an hydraulic actuator disposed on one side of the device, one end of the actuator being pivotally attached to the first support frame and the second end of the actuator being pivotally attached to the second support frame;

hydraulic fluid supply means being connected to the actuator to selectively supply fluid to the actuator; and, actuator linkage means connected to the handle means and to the hydraulic fluid supply means, pivotal movement of the handle means causing the amount of fluid available to the actuator to be varied, thereby causing the actuator to tilt the second frame relative to the first support frame.

4. The apparatus of claim 3 and further comprising:

a mass pivotally suspended from the actuator linkage means, the mass being displaced by the pivotal movement of the handle means and by the tilting of the second support frame relative to the first support frame, displacement of the mass acting to control the amount of fluid available to the actuator.

5. The apparatus of claim 1 wherein the structure operable with the prime mover includes a radiative cooler and wherein at least portions of the structural elements of the second support frame include tubular members, the tubular members carrying cooling fluid between the prime mover and the radiative cooler, the apparatus further comprisng flexible hose means connecting the tubular members to the prime move and to the radiative cooler.

6. The apparatus of claim 1 wherein the pivotal drive transmission means comprise:

a drive shaft; and, universal joints pivotally connected to each end of the drive shaft, the universal joint at one end of the drive shaft being pivotally connected to the prime mover, the universal joint at the other end of the drive shaft being pivotally connected to the differential mechanism on the axle, power being continuously transmitted from the prime mover to the axle at any relative orientation of the second support frame to the first support frame.

* * * * *